(12) United States Patent
Kaneuchi

(10) Patent No.: US 8,326,752 B2
(45) Date of Patent: Dec. 4, 2012

(54) COMMUNITY GIFT SYSTEM, INFORMATION PROCESSING METHOD, AND INFORMATION PROCESSING PROGRAM

(76) Inventor: Yoshihiro Kaneuchi, Asaka (JP)

( * ) Notice: Subject to any disclaimer, the term of this patent is extended or adjusted under 35 U.S.C. 154(b) by 0 days.

(21) Appl. No.: 13/171,977

(22) Filed: Jun. 29, 2011

(65) Prior Publication Data

US 2011/0320348 A1    Dec. 29, 2011

(30) Foreign Application Priority Data

Jun. 29, 2010    (JP) ................................ 2010-147198

(51) Int. Cl.
*G06Q 40/00*    (2006.01)
(52) U.S. Cl. ........................................... 705/39; 705/40
(58) Field of Classification Search ............... 705/35–40
See application file for complete search history.

(56) References Cited

U.S. PATENT DOCUMENTS

| | | | | |
|---|---|---|---|---|
| 7,881,971 B1 * | 2/2011 | Nguyen et al. | ............... | 705/26.8 |
| 8,050,676 B2 * | 11/2011 | Yabe et al. | .................. | 455/435.1 |

FOREIGN PATENT DOCUMENTS

| | | |
|---|---|---|
| JP | 2001-209678 A | 8/2001 |
| JP | 2001-290899 A | 10/2001 |
| JP | 2001-325501 A | 11/2001 |
| JP | 2002-329017 A | 11/2002 |
| JP | 2003-36381 A | 2/2003 |
| JP | 2004-185267 A | 7/2004 |
| JP | 2007-280371 A | 10/2007 |
| JP | 2009-205434 A | 9/2009 |
| JP | 2009/301318 A | 12/2009 |
| JP | 2010-113659 A | 5/2010 |
| JP | 2010-518481 A | 5/2010 |
| WO | 2008/094168 A1 | 8/2008 |

OTHER PUBLICATIONS

Patent Abstracts of Japan English abstract of JP 2009-205434A.
Patent Abstracts of Japan English abstract of JP 2009/301318 A.
Patent Abstracts of Japan English abstract of JP 2004-185267 A.
Patent Abstracts of Japan English abstract of JP 2007-280371 A.
Patent Abstracts of Japan English abstract of JP 2001-209678 A.
Patent Abstracts of Japan English abstract of JP 2001-325501 A.
Patent Abstracts of Japan English abstract of JP 2002-329017 A.
Patent Abstracts of Japan English abstract of JP 2003-36381 A.

* cited by examiner

*Primary Examiner* — Thu Thao Havan
(74) *Attorney, Agent, or Firm* — Ladas & Parry LLP

(57) ABSTRACT

An organizer freely designates a purpose, forms a community, very easily and efficiently collects money from participants, and gives a gift. To accomplish this, a community gift system that, when giving a gift to a specified recipient, allows an organizer and participants to form a community and collect money in the community as a cost of gift giving, includes a generator that generates a community database including name data of the organizer and data of the recipient in response to access via a network from the organizer who plans the gift giving, and a storage unit that accepts payment of money via the network from a participant who has approved of the gift giving, and stores data of the paid money in the community database so that the money can be used as the cost of the gift giving.

3 Claims, 30 Drawing Sheets

FIG. 5

CUSTOMER INFORMATION TABLE 501

| COLUMN NAME | EXPLANATION |
|---|---|
| CUSTOMER ID | UNIQUE ID FOR CUSTOMER IDENTIFICATION |
| CUSTOMER CATEGORY | MEMBER REGISTRATION STATE OF CUSTOMER (SET MEMBER REGISTRATION OR INFORMATION REGISTRATION) MEMBER REGISTRATION = CUSTOMER WHO HAS ALREADY REGISTERED MAIL ADDRESS AND NAME INFORMATION REGISTRATION = CUSTOMER WHO HAS ALREADY REGISTERED MAIL ADDRESS, NAME, AND ADDRESS |
| NAME | REGISTERED NAME OF CUSTOMER |
| ADDRESS | REGISTERED ADDRESS OF CUSTOMER |
| MAIL ADDRESS | REGISTERED MAIL ADDRESS OF CUSTOMER |

| PAYMENT INFORMATION TABLE | |
|---|---|
| COLUMN NAME | EXPLANATION |
| ORDER ID | UNIQUE ID FOR GIFT ORDER IDENTIFICATION |
| CUSTOMER ID | UNIQUE ID FOR CUSTOMER IDENTIFICATION |
| PAYMENT CLASSIFICATION | PAYMENT CLASSIFICATION UPON GIFT ORDER (SET ORGANIZER OR PARTICIPANT) |
| PAYMENT METHOD | PAYMENT METHOD UPON GIFT ORDER (SET PAYMENT BY CREDIT CARD OR PAYMENT BY CELLULAR PHONE) |
| AMOUNT OF MONEY | PAID AMOUNT OF MONEY |

ORDER INFORMATION TABLE 701

| COLUMN NAME | EXPLANATION |
|---|---|
| ORDER ID | UNIQUE ID FOR GIFT ORDER IDENTIFICATION |
| DATE OF ORDER | DATE OF GIFT ORDER ACCEPTANCE |
| TOTAL AMOUNT OF MONEY | TOTAL AMOUNT OF MONEY PAID BY ORGANIZER AND PARTICIPANTS IN GIFT ORDER |
| SENDER INFORMATION | ADDRESS OF ORGANIZER IN GIFT ORDER |
| RECEPTION CONFIRMATION FLAG | FLAG SET WHEN RECIPIENT HAS APPROVED RECEPTION IN RESPONSE TO RECEPTION CONFIRMATION MAIL |

FIG. 8

801 DELIVERY INFORMATION TABLE

| COLUMN NAME | EXPLANATION |
|---|---|
| ORDER ID | UNIQUE ID FOR GIFT ORDER IDENTIFICATION |
| DELIVERY ID | UNIQUE ID FOR IDENTIFICATION OF DELIVERY INFORMATION FOR GIFT ORDER |
| DELIVERY STATUS | STATUS OF DELIVERY (SET ONE OF WAIT TO DELIVER, DELIVER, AND DELIVERED) |
| SHIPPING DATE | DATE AND TIME OF DELIVERY OF GIFT MERCHANDISE ITEM |
| EXPECTED DATE OF ARRIVAL | EXPECTED DATE OF ARRIVAL OF DELIVERED MERCHANDISE ITEM |
| EXPECTED TIME OF ARRIVAL | EXPECTED TIME OF ARRIVAL OF DELIVERED MERCHANDISE ITEM |
| ADDRESS OF DELIVERY DESTINATION | ADDRESS OF RECIPIENT |

802 DELIVERY DETAIL INFORMATION TABLE

| COLUMN NAME | EXPLANATION |
|---|---|
| DELIVERY ID | UNIQUE ID FOR IDENTIFICATION OF DELIVERY INFORMATION FOR GIFT ORDER |
| MERCHANDISE ITEM TO BE DELIVERED | NAME OF MERCHANDISE ITEM TO BE DELIVERED |

TOP >···
COMMUNITY GIFT

IMAGE

COMMUNITY GIFT OFFERS NEW WAY OF FLORAL GIFT

EVERYONE MAKES CONTRIBUTION TO SEND FLOWERS. "COMMUNITY GIFT" MAKES IT POSSIBLE. THE SUM OF EVERYONE'S WISHES AMOUNTS TO THE PURCHASE PRICE.

YOU CAN DO IT IN FIVE STEPS.
1. SELECT IMAGE OF FLOWERS
2. ENTER INFORMATION OF RECIPIENT
3. WRITE MESSAGE
4. PAY YOUR SHARE
5. SEND INVITATION MAIL TO FRIENDS

PLEASE CLICK HERE FOR DETAILS

NOTE:
TO USE COMMUNITY GIFT, YOU NEED PLACE ORDER 8 DAYS IN ADVANCE OF DELIVERY DATE

- ITEMS RECOMMENDED AS
  BIRTHDAY GIFTS
  SUMMER GIFTS (CHUGEN/SUMMER GREETINGS)
  GIFTS FOR FAREWELL/WELCOME
  GIFTS TO SICK PERSON
  CONDOLENCE GIFTS/OFFERINGS/GIFTS OF BON FESTIVAL

- RECOMMENDED ITEMS IN COLOR COORDINATION
  PINK: BOUQUET/ARRANGEMENT → (A)
  WHITE & GREEN: BOUQUET/ARRANGEMENT
  BLUE: BOUQUET/ARRANGEMENT
  YELLOW: BOUQUET/ARRANGEMENT

911

[0]RETURN TO TOP PAGE

```
TOP >···
         SHOPPING CART                              1001
● INPUT OF ORDER INFORMATION ●
      ■■ CONFIRM CUSTOMER INFORMATION ■■
◆ CUSTOMER INFORMATION
TARO HOKKI

◆ ZIP CODE
〒141-0032

◆ ADDRESS
00-000, ●●-CHO, SHINAGAWA-KU, TOKYO

◆ TELEPHONE NUMBER
03-1234-0000

◆ FAX
03-1234-0000

◆ NAME OF SENDER
| TARO HOKKI |

＊THIS NAME WILL BE PRINTED ON INVOICE AS CLIENT'S
NAME. IF YOU WANT JOINT SIGNATURE, PLEASE CHANGE THE
NAME IN THE FIELD.

■■  SELECT DELIVERY DESTINATION  ■■
SELECT REGISTRATION OF DELIVERY DESTINATION

◆ IF YOU WANT DELIVERY TO HOME OR REGISTERED
DESTINATION, PLEASE SELECT THE DESTINATION FROM THE
LIST
| SELECT                                ▼ |          1011

|    OK    |                              1012

◆ IF YOU WANT DELIVERY TO NEW DESTINATION, CLICK HERE
            |    OK    |                              1013

[0]RETURN TO TOP PAGE
```

◆ PLEASE ADVISE US OF YOUR SPECIAL REQUIREMENTS

◆ EXPLANATION TO PARTICIPANTS    PLEASE WRITE EXPLANATION ABOUT THE GIFT TO OTHER PARTICIPANTS

◆ RECEPTION CONFIRMATION TO GIFT RECIPIENT

1102

＊FLOWERS ARE PERISHABLE. WE WOULD LIKE TO BE SURE THAT THE RECIPIENT CAN RECEIVE THE GIFT AS SOON AS POSSIBLE

PLEASE SELECT "CONFIRM" UNLESS YOU ARE SURE THAT THE RECIPIENT CAN RECEIVE THE GIFT

PLEASE CLICK HERE FOR DETAILS

NEXT

[0]RETURN TO TOP PAGE

FIG. 11B

1202 — TOP > ...

SHOPPING CART

● COMPLETE ●

MR. TARO HOKKI. THANK YOU FOR ORDER

∗ PAYMENT BY CREDIT CARD
ORDER NUMBER: 10050549
THE BILL WILL BE SENT FROM YOUR CREDIT CARD COMPANY

27 POINTS WILL BE ISSUED BY THIS ORDER.

CONFIRMATION TO GIFT RECIPIENT

◆ NOTE ◆
FLOWERS ARE PERISHABLE, AND WE WANT THE RECIPIENT TO BE SURE TO RECEIVE THE GIFT AS SOON AS POSSIBLE. PLEASE SEND MAIL TO THE RECIPIENT FROM HERE TO CONFIRM IF HE/SHE CAN SURELY RECEIVE THE GIFT AT THE DESIGNATED ADDRESS ON THE DESIGNATED DELIVERY DATE/TIME.
1221 — WE REQUEST NOT TO CHANGE THE MAIL TEXT.

CONFIRM BY MAIL

CALL TO PARTICIPANTS

1222 — LET'S INVITE PARTICIPANTS. MOVE TO INVITATION PAGE FROM THE LINK BELOW

SEND INVITATION MAIL

IF YOU HAVE TWITTER ACCOUNT, TWEET URL FOR PARTICIPATION FROM HERE

Ⓑ

◆ LET'S TWEET TO CALL FOR INVITATION! ◆

ID [ ]   PASS [ ]

http://eshop.flowermarket.com/pc/?a=cg&m=entry&cg_key=XXXXXXX

[ TWEET ]

FIG. 12B

• REMIND LIST •
WE WILL REMIND YOU BY MAIL OF IMPORTANT ANNIVERSARIES TO BE KEPT IN MIND

• LATEST LIST
• 3. SEPTEMBER
AYANE USUKINE: BIRTHDAY
15 DAYS AGO: COMMUNITY GIFT
LOVES RED FLOWERS

• 11. SEPTEMBER
AKANE KANEUCHI: WEDDING ANNIVERSARY
15 DAYS AGO: NORMAL REMIND

• SEE ALL LISTS
• ADD LIST

— 1313

• RECEIVED GIFTS •

• LATEST GIFTS
GIFT ARRIVED 3. AUGUST
　　　ORGANIZER: MR. DAIJIRO HOKKI
　　　PARTICIPANTS: 3

• SEE ALL LISTS

— 1314

• DESTINATION LIST
• CONFIRM/CHANGE MEMBER INFORMATION

[0]RETURN TO TOP PAGE

FIG. 13B

```
TOP >···     COMMUNITY GIFT                      1302
         ——— ORGANIZER ———
DESTINATION: MR. TARO HOKKI

ITEM NAME
         SPECIAL LIMITED TO ARRIVAL IN AUGUST
         ELEGANT PINK BOUQUET OF AUTUMN HYDRANGEA
         AND SHOWY PRAIRIE GENTIAN

CURRENT TOTAL AMOUNT: ¥ 14,000 (INCLUDING TAX)
WITH SHIPPING (¥ 500) INCLUDED

CURRENT NUMBER OF PARTICIPANTS: 6

DELIVERY DATE: 8. AUGUST

CLOSING DATE: 3. AUGUST 12:00 (3 DAYS TO GO)

YOUR MESSAGE:

• INVITE FRIENDS                                  1311
        SEND INVITATION MAIL
           • QR CODE
           [QR CODE]
       CLICK HERE TO SEE A LARGER IMAGE

IF YOU HAVE TWITTER ACCOUNT, TWEET URL FOR
PARTICIPATION FROM HERE
       ◆ LET'S TWEET TO CALL FOR INVITATION! ◆
ID [      ]   PASS [      ]
                                      [ TWEET ]

MAIL TO MR. TARO UKETORI
        SEND CONFIRMATION MAIL TO RECIPIENT

AMOUNT FOR PARTICIPATION: ¥ 3,000                 1312
              [    ADD    ]

[0]RETURN TO TOP PAGE
```

FIG.13C

TITLE: DON'T YOU PARTICIPATE IN COMMUNITY GIFT?

TEXT:

PLEASE INPUT TITLE AND TEXT OF INVITATION MAIL TO FRIENDS

✶DON'T CHANGE THE URL BELOW.

::
CLICK HERE TO PARTICIPATE
http://eshop.flowermarket.com/pc/?a=cg&m=entry&cg_key=XXXXXXX Powerd by Community Gift

FIG. 15A

TITLE: FLORAL GIFT FOR YOU

MR./MS. ○○
WE WANT TO SEND FLOWERS TO YOU.

PLEASE CONFIRM THE FOLLOWINGS SO THAT YOU CAN SURELY RECEIVE THE GIFT. THANKS IN ADVANCE FOR YOUR HELP.

CLICK HERE FOR CONFIRMATION http://eshop.flowermarket.com/pc/?a=cg&m=receive&cg_key=XXXXXXX PLEASE CLICK UNTIL △ (MONTH) ▲ (DAY) ▽ (HOUR), OTHERWISE THE GIFT WILL BE CANCELED.

Powerd by Community Gift

FIG. 15B

TOP >···     COMMUNITY GIFT — 1702
──── CONFIRMATION PAGE ────

WE HAVE RECEIVED ORDER OF A GIFT FOR MR./MS. ○○ FROM MR./MS. ●● AND OTHERS.

PLEASE MAKE CONFIRMATION UNTIL △ (MONTH) ▲ (DAY) 12:00, OTHERWISE THE GIFT WILL BE CANCELED.

THE ITEM WILL ARRIVE AT THE ADDRESS BELOW IN THE MORNING OF 12. JUNE (SAT).

IF YOU CANNOT RECEIVE AT THE ADDRESS BELOW IN THE TIME ZONE NAMED, PLEASE SELECT DATE/TIME OR PLACE WHERE YOU CAN RECEIVE AND CLICK "CHANGE".

NOTE:
YOU CAN CHANGE ONLY ONCE, SO BE CAREFUL

──- CONFIRM DELIVERY DATE -──

(E) →

| DELIVERY DATE: | 8. AUGUST (SUN) ▼ |
|---|---|
| DELIVERY TIME ZONE: | MORNING ▼ |

──- CONFIRM DELIVERY DESTINATION -──

| RECIPIENT'S NAME: | TARO UKETORI |
|---|---|
| ZIP CODE: | 141111    SEARCH FOR ZIP CODE |
| PREFECTURE: | TOKYO |
| MUNICIPALITY: | ○○-CHO, SHINAGAWA-KU |
| ADDRESS, BUILDING NAME: | MAISON IRUGI |
| TELEPHONE NUMBER | 0434660999 |

OK WITHOUT CHANGE        (F)
           CHANGE

IF ANY POINTS ARE UNCLEAR, PLEASE CONTACT THE ONLINE SHOP (045-XXX-XXXX)

[0]RETURN TO TOP PAGE

FIG.17B

COMMUNITY GIFT SYSTEM, INFORMATION PROCESSING METHOD, AND INFORMATION PROCESSING PROGRAM

This application claims the benefit of Japanese Patent Application No. 2010-147198, filed on Jun. 29, 2010, which is hereby incorporated by reference herein in its entirety.

BACKGROUND OF THE INVENTION

1. Field of the Invention

The present invention relates to a technique of providing a gift giving service using a network.

2. Description of the Related Art

Japanese Patent Laid-Open No. 2001-290899 discloses a system concerning wedding gifts in which a bridal pair opens a list of goods of their desire to the public via a network, and persons who have accessed the page select gifts they want to give.

On the other hand, Japanese Patent Laid-Open No. 2010-113659 discloses a technique of collecting contributions from a plurality of users on a network to purchase merchandise items.

In the techniques disclosed in the above literatures, however, each person gives one gift or one contribution. Hence, the techniques disclosed in the above literatures contain no idea of causing a plurality of persons to make a communal purchase of one gift.

That is, an organizer cannot freely designate a purpose, form a community, collect money from participants, and give a gift.

SUMMARY OF THE INVENTION

The present invention enables to provide a system that allows an organizer to freely designate a purpose, form a community, collect money from participants, and give a gift.

One aspect of the present invention provides a community gift system that, when giving a gift to a specified recipient, allows an organizer and participants to form a community and collect money in the community as a cost of gift giving, comprising:

a generator that generates a community database including name data of the organizer and data of the recipient in response to access via a network from the organizer who plans the gift giving; and a storage unit that accepts payment of money via the network from a participant who has approved of the gift giving, and stores data of the paid money in the community database so that the money can be used as the cost of the gift giving.

Another aspect of the present invention provides an information processing method using a community gift system that, when giving a gift to a specified recipient, allows an organizer and participants to form a community and collect money in the community as a cost of gift giving, comprising:

providing a community database including name data of the organizer and data of the recipient upon accepting access via a network from the organizer who plans the gift giving; and accepting payment of money via the network from a participant who has approved of the gift giving, and storing data of the paid money in the community database so that the money can be used as the cost of the gift giving.

Still other aspect of the present invention provides a computer-readable storage medium storing an information processing program for implementing a community gift system that, when giving a gift to a specified recipient, allows an organizer and participants to form a community and collect money in the community as a cost of gift giving, the information processing program causing a computer to execute:

providing a community database including name data of the organizer and data of the recipient upon accepting access via a network from the organizer who plans the gift giving; and accepting payment of money via the network from a participant who has approved of the gift giving, and storing data of the paid money in the community database so that the money can be used as the cost of the gift giving.

BRIEF DESCRIPTION OF THE DRAWINGS

Further features of the present invention will be apparent from the following description of exemplary embodiments with reference to the attached drawings.

FIG. 5 is a view showing the detailed contents of a customer information table according to the second embodiment of the present invention;

FIG. 6 is a view showing the detailed contents of a payment information table according to the second embodiment of the present invention;

FIG. 7 is a view showing the detailed contents of an order information table according to the second embodiment of the present invention;

FIG. 8 is a view showing the detailed contents of a delivery information table according to the second embodiment of the present invention;

FIGS. 9A and 9B are views showing an example of a screen displayed by the community gift system according to the second embodiment of the present invention;

FIG. 10 is a view showing an example of a screen displayed by the community gift system according to the second embodiment of the present invention;

FIGS. 11A and 11B are views showing an example of a screen displayed by the community gift system according to the second embodiment of the present invention;

FIGS. 12A and 12B are views showing an example of a screen displayed by the community gift system according to the second embodiment of the present invention;

FIGS. 13A, 13B and 13C are views showing an example of a screen displayed by the community gift system according to the second embodiment of the present invention;

FIGS. 15A and 15B are views showing an example of a screen displayed by the community gift system according to the second embodiment of the present invention;

FIGS. 17A, 17B and 17C are views showing an example of a screen displayed by the community gift system according to the second embodiment of the present invention;

DESCRIPTION OF THE EMBODIMENTS

Preferred embodiments of the present invention will now be described in detail with reference to the accompanying drawings. Note that the constituent elements described in the embodiments are merely examples, and the technical scope of the present invention is not limited to them.

(First Embodiment)

Figure 1:
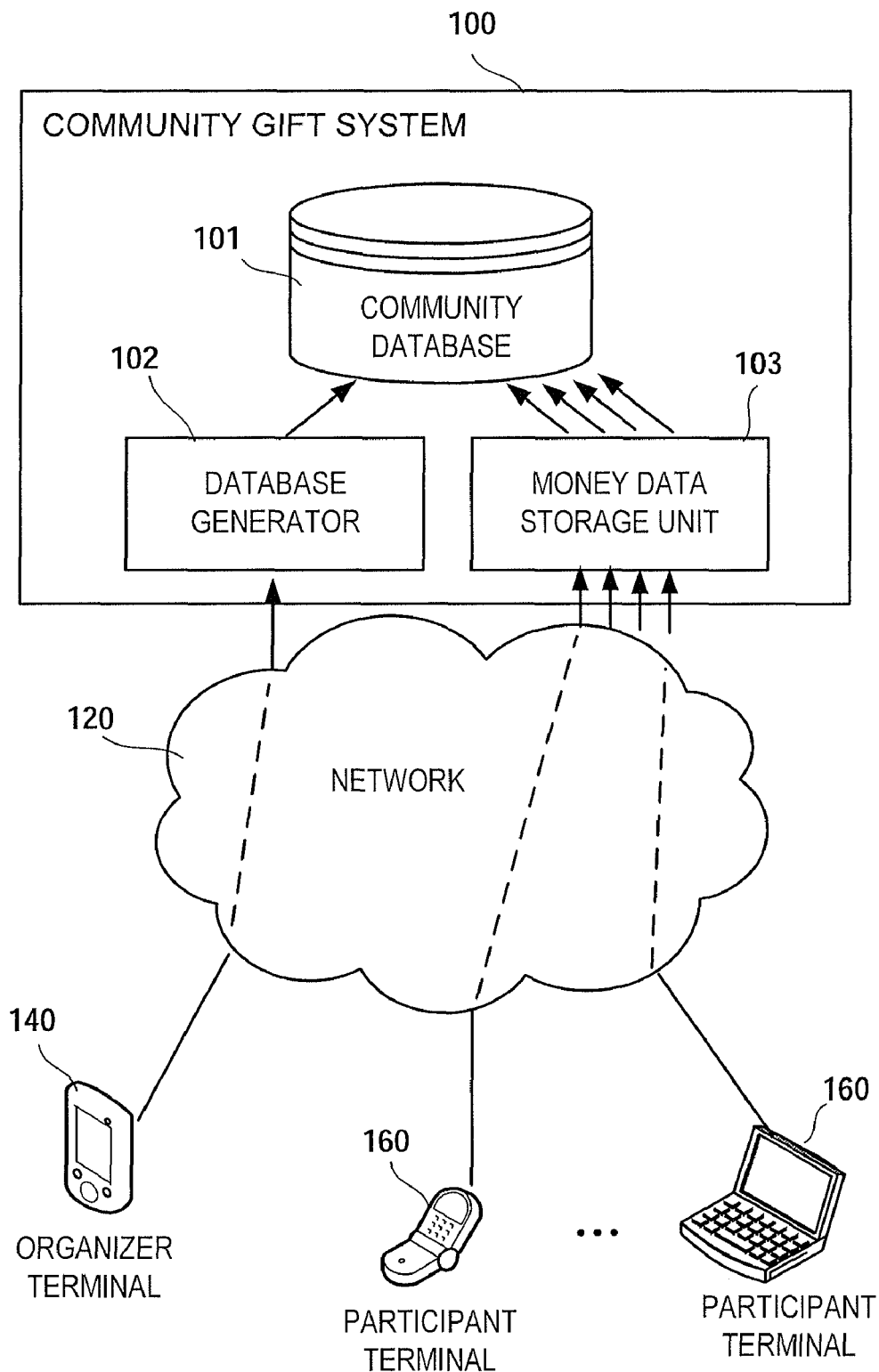
FIG. 1 is a block diagram showing the arrangement of the first embodiment of the present invention.

FIG. 1 illustrates the arrangement of a community gift system 100 according to the first embodiment of the present invention. The community gift system 100 shown in FIG. 1 is an information processing system that, when giving a gift to a specified recipient, allows an organizer and participants to form a community and collect money in the community as the cost of the gift giving. Upon being accessed via a network 120 by a terminal (organizer terminal) 140 of an organizer who plans gift giving, the community gift system 100 generates a community database 101 including name data of the organizer and data of the recipient. The community database 101 includes a money data storage unit 103. The money data storage unit 103 accepts payment via the network 120 from terminals (participant terminals) 160 of participants who have approved of the gift giving, and stores the data of the paid money in the community database 101 so that the money can be used as the cost of the gift giving.

This system configuration enables an organizer to freely designate a purpose, form a community, very easily and efficiently collect money from participants, and give a gift.

(Second Embodiment)

Figure 2:
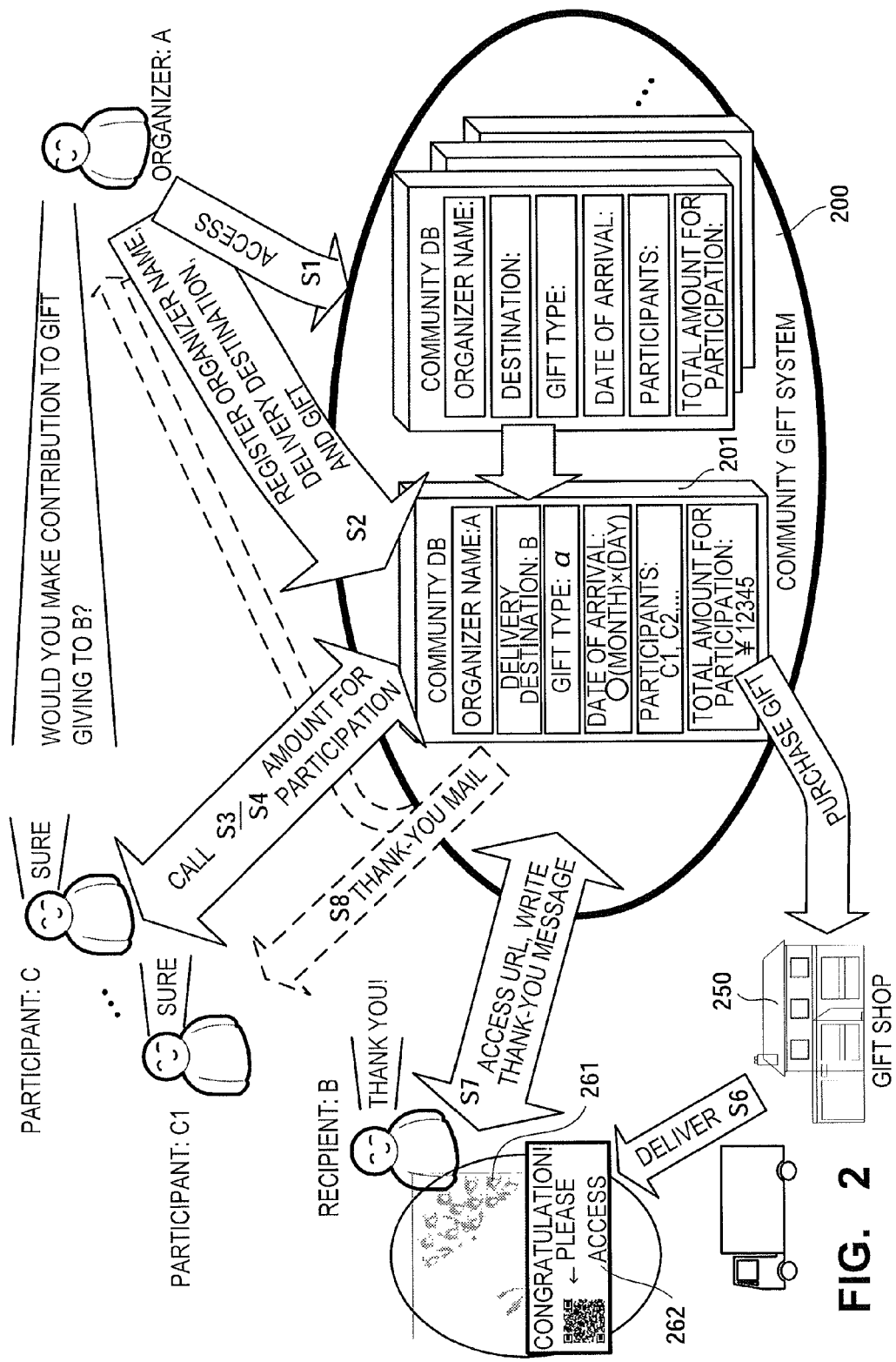
FIG. 2 is a view showing the contents of a service provided using a community gift system according to the second embodiment of the present invention.

A community gift system according to the second embodiment of the present invention will be explained. The community gift system of this embodiment too is an information processing system that, when giving a gift to a specified recipient, allows an organizer and participants to form a community and collect money in the community as the cost of the gift giving. FIG. 2 is a view showing the contents of a service provided using a community gift system 200 according to this embodiment.

[Overview of Service]

Step S1: First, the community gift system 200 accepts access from a terminal (to be referred to as "organizer terminal" hereinafter) used by an organizer A, and transmits a community generation screen to the organizer terminal. A screen 901 shown in FIGS. 9A and 9B explains the service providing procedure of the community gift system 200.

Step S2: The community gift system 200 accepts, from the organizer terminal, input of the organizer name, the recipient, the gift type, the delivery date, the amount for participation of the user as the organizer, and the like via the community generation screen. The community gift system 200 then generates an original community database 201 containing these pieces of information. As shown in FIG. 2, the image is that the organizer writes his/her name and the like on an empty collection box prepared in advance in the community gift system 200 so as to generate an original collection box (community database 201). At this point of time, the community gift system 200 gives an order to a gift shop 250 while promising to do purchase for the minimum amount (amount of money paid only by the organizer for participation) and notify the shop of the final amount to be paid on a designated date again.

Step S3: Next, the organizer A asks for participants in a variety of ways and leads them to the original community database 201 generated in step S2. The community gift system 200 urges the prospective participants to input a mail address and an amount for participation, prepares a participation page to accept input of a congratulatory message, and generates a message including the URL of the participation page. Using the message, the organizer A sends mail to the prospective participants he/she wants to call for participation.

Step S4: The prospective participants who have approved of the objective (the destination of the gift and its contents) of the community database 201 register a desired amount for participation in the community database 201 as participants C1 to Cn. The community gift system 200 accepts input of the mail address and the amount for participation and payment from the participants C1 to Cn via the participation page. The community database 201 adds the participants and updates the total amount for participation.

Step S5: On the closing date counted backward from the delivery date, the community gift system 200 newly gives an order to the shop 250 to send, to a recipient B, a gift 261 corresponding to the total amount for participation collected at that point of time. At this time, the community gift system 200 sends, to the shop 250, a URL that allows the recipient B to access a thank-you page including the organizer/participant list and a thanks generation screen so that the shop prints the URL on a message card 262 as a QR code and an ID/PW (for easy access from a PC) to recognize the URL.

Step S6: The shop 250 delivers the gift 261 and the message card 262 with the QR code to the recipient B.

Step S7: When the recipient B who has received the gift accesses the URL printed on the message card 262, the community gift system 200 generates the thank-you page and provides it to the recipient terminal.

Step S8: Upon accepting a thank-you message sending instruction from the recipient terminal via the thank-you page, the community gift system 200 sends the thank-you message to the designated organizer and participants by referring to the community database 201.

[Internal Arrangement of System]

Figure 3:
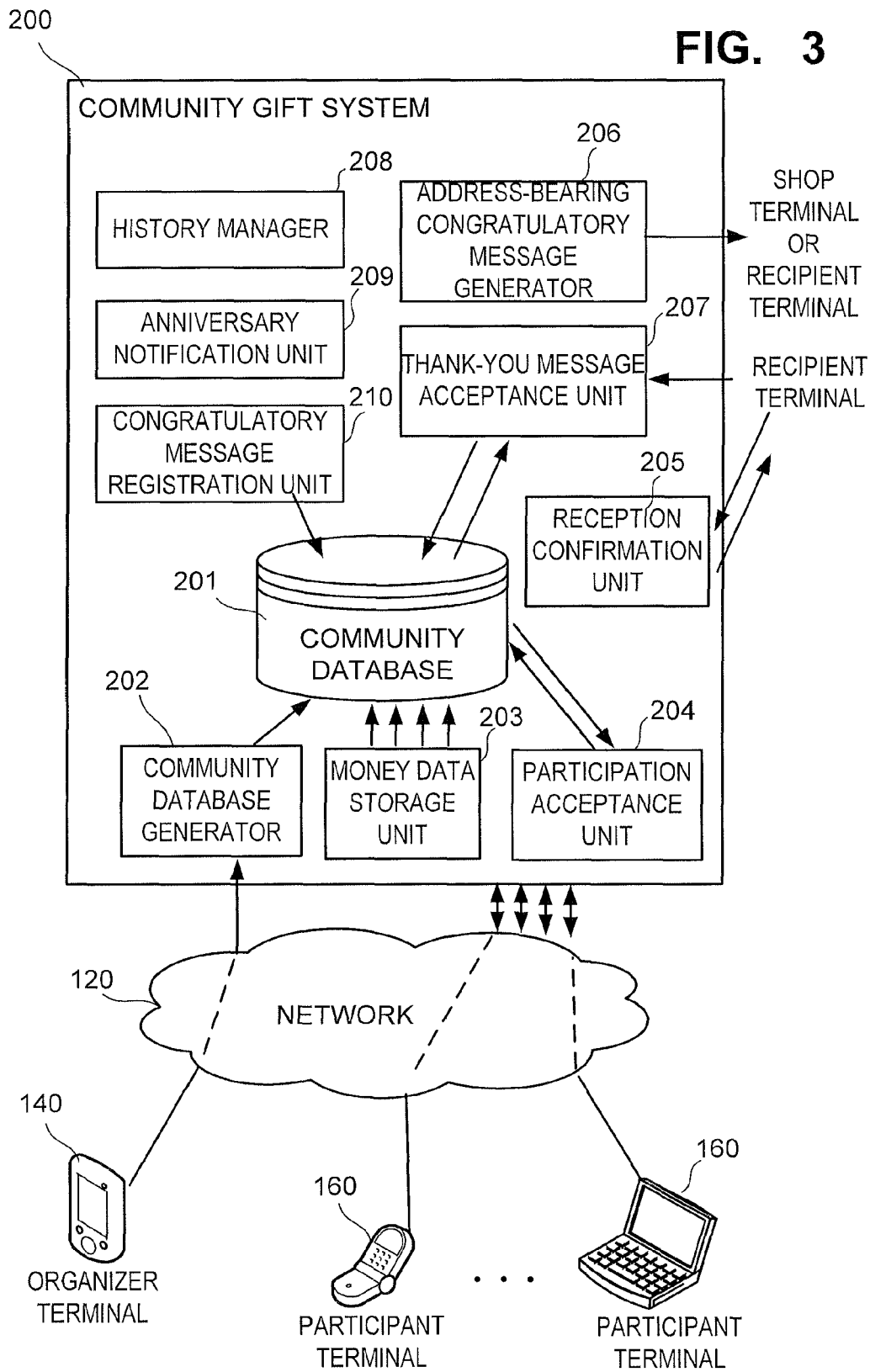
FIG. 3 is a block diagram showing the internal arrangement of the community gift system according to the second embodiment of the present invention.

FIG. 3 is a block diagram showing the internal arrangement of the community gift system 200. The community gift system 200 has an arrangement capable of providing the user a service more precise than that of the community gift system 100 according to the first embodiment. Note that the community gift system 200 shown in FIG. 3 can be implemented as a web application. The constituent elements such as a community database generator 202 are implemented as software modules. That is, when a processor incorporated in a web application server that is hardware reads out the software modules from a storage device and executes them, the system functions as a whole. However, the present invention is not limited to this, and some or all of the functions of the community gift system 200 may be implemented by dedicated hardware.

As shown in FIG. 3, the community gift system 200 includes the community database generator 202, a money data storage unit 203, a participation acceptance unit 204, and a reception confirmation unit 205 in addition to the already described community database 201. The community gift system 200 further includes an address-bearing congratulatory message generator 206 and a thank-you message acceptance unit 207. The community gift system 200 also includes a history manager 208, an anniversary notification unit 209, and a congratulatory message registration unit 210.

The community database 201 includes name data of the organizer and data of the recipient, and stores the data of participants who have approved of gift giving and the data of money paid by the participants via the network.

The community database generator 202 receives organizer name data and gift recipient data via the network 120 from the terminal 140 of the organizer who plans gift giving, and generates the original community database 201 including these data.

The money data storage unit 203 accepts payment via the network from the participants who have approved of the gift giving, and stores the money data in the community database 201 so that the money can be used as the cost of the gift giving.

The participation acceptance unit 204 generates a participation acceptance screen to accept input of the desired amount of money to be paid by each participant and input of the contact address of each participant, and provides the participation acceptance screen upon accepting access from the participant terminal 160 via the network 120. The participation acceptance unit 204 also generates a participation acceptance message to call on other prospective participants, whose contact addresses are known by the participants, to participate in the gift giving and lead them to the participation acceptance screen. The participation acceptance unit 204 also accepts input of a message for the recipient.

The reception confirmation unit 205 generates a query message to ask the recipient if he/she will accept the gift giving or not. The organizer selects whether to ask the recipient. The generated message is sent from the mailer of the organizer terminal. Since reception only from a designated domain may be set in a cellular phone as an anti-spam measure, the system adopts the mechanism for sending the message as mail from a friend.

The query message may include the recipient's address partially or wholly, and request the recipient to confirm whether the address is correct. That is, when the community database generator 202 generates the community database 201, inputting the recipient's address is not essential. The community database 201 may be generated based on, for example, only the name and mail address input. The system may place a firm order at the point of time the reception confirmation unit 205 has confirmed that the recipient will receive the gift.

When giving a gift corresponding to the money data stored in the community database 201, the address-bearing congratulatory message generator 206 generates an address to be sent to the recipient. The address-bearing congratulatory message generator 206 generates a QR code representing the address, and sends a message card with the QR code printed to the recipient directly or via the shop terminal.

The thank-you message acceptance unit 207 generates a display screen including information about the organizer and participants, which is to be displayed on the recipient terminal in response to access to the address generated by the address-bearing congratulatory message generator 206. The thank-you message acceptance unit 207 also generates a display screen to accept a thank-you message for the organizer and participants from the recipient, and provides it in response to access from the recipient terminal. The thank-you message acceptance unit 207 generates a display screen including a field where the recipient inputs a thank-you message and a list of organizer and participant names selectable as thank-you message sending destinations.

The history manager 208 stores the history of service received in the past by the users registered in the community gift system 200. More specifically, the history manager 208 manages links to community databases the users have planned as an organizer, community databases in which the users have involved as a participant, and community databases in which the users have involved as a gift recipient.

The anniversary notification unit 209 has a function of notifying a user registered in the community gift system 200 of various kinds of anniversaries. For example, the anniversary notification unit 209 stores various anniversaries such as the birthday of an organizer who gave a gift, the birthday of a recipient who received a gift in the past, and a wedding anniversary, and notifies a user of an anniversary a predetermined period (for example, one month) before it.

The congratulatory message registration unit 210 has a function of registering a message to be sent to the recipient when the user plans a gift giving community or participates in it. The registered congratulatory message is transmitted to the thank-you message acceptance unit 207 and displayed on the recipient terminal. The congratulatory message is not only displayed by the thank-you message acceptance unit 207 but also sent as a message card made of actual paper.

[Community Database]

Figure 4:
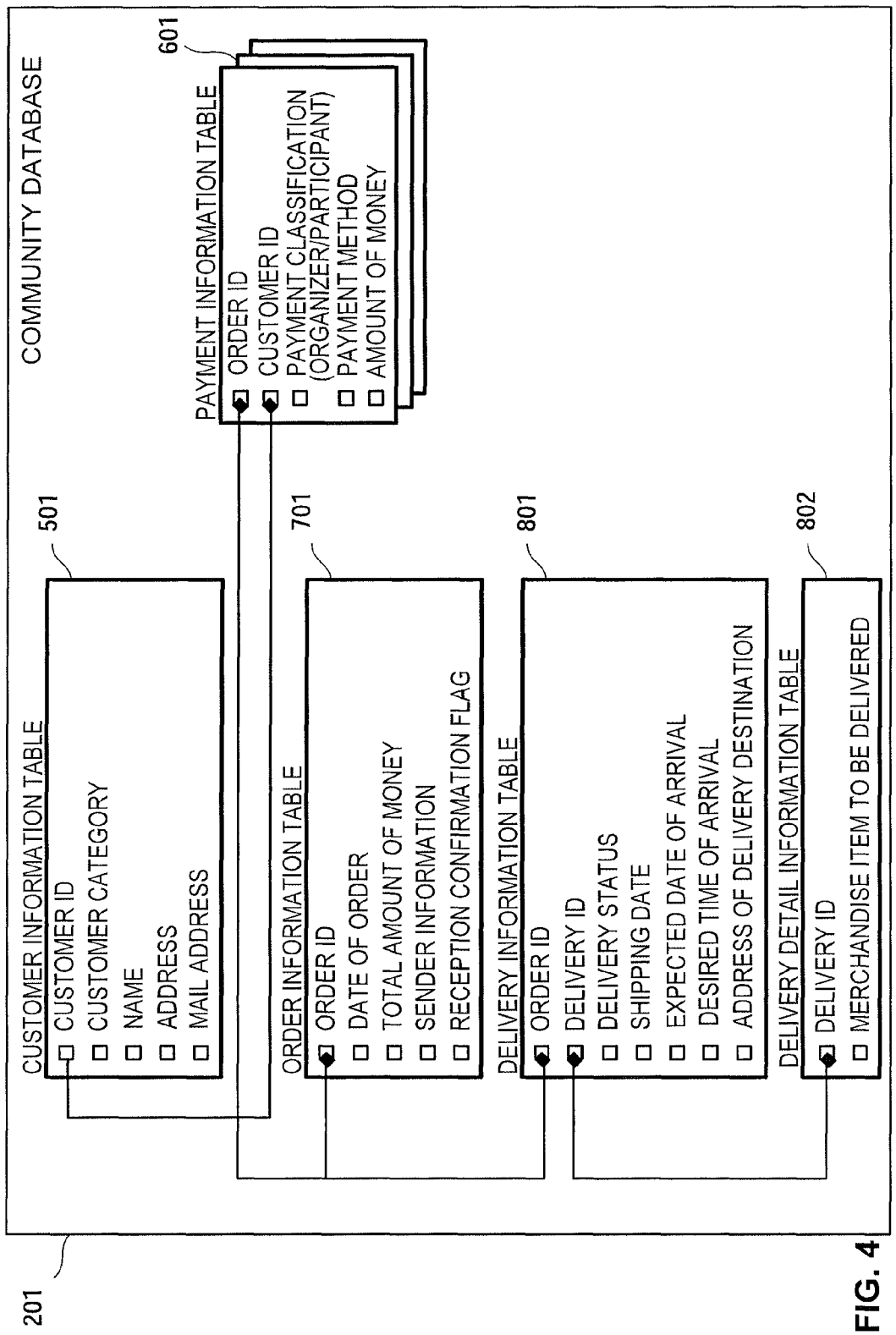
FIG. 4 is a view showing the internal arrangement of a community database according to the second embodiment of the present invention.

The arrangement of the community database 201 will be described in detail with reference to FIGS. 4 to 8. FIG. 4 is a view showing the internal arrangement of the community database 201. As shown in FIG. 4, the community database 201 includes a set of a payment information table 601, an order information table 701, and a delivery information table 801, which have a common order ID. The community database 201 may include a customer information table 501 and a delivery detail information table 802.

The community database 201 need not always include the customer information table 501 and the delivery detail information table 802. For example, the customer information table 501 prepared in an external database connected to the community gift system 200 via a network may be used. For example, customer information registered in the server managed by the gift shop may be used. The community database need only be able to refer to the customer information via the network. On the other hand, the delivery detail information table 802 may be included in the database of a delivery company. The community database need only be able to refer to the delivery detail information via the network.

FIG. 5 is a view showing the detailed contents of the customer information table 501. The customer information table 501 includes a customer ID serving as a unique ID that identifies a customer, a customer category that discriminates between member registration and information registration, a customer name, a customer address, and a customer mail address. As described above, the customer information table 501 need not always be prepared in the community gift system.

FIG. 6 is a view showing the detailed contents of the payment information table 601. The payment information table 601 includes an order ID, a customer ID, a payment classification (organizer/participant), a payment method, and amount information. The customer ID is linked to the customer information table.

The payment information table 601 includes an order ID serving as a unique ID that identifies a gift order. A unique order ID is issued ever time the organizer plans gift giving community formation. The order ID is the very identification information to be used to identify each community database 201. The payment information table 601 is formed every time the organizer or a participant pays money as the participation cost. The same order ID is added for the same community. That is, a plurality of payment information tables 601 included in one community database 201 all include the same ID as the order ID added for each gift giving plan.

The customer ID is an identifier to be used to identify the organizer or a participant who has paid money as the participation cost. It is possible to uniquely call the customer information table 501 shown in FIG. 5 by the customer ID.

The payment information table 601 further includes a payment classification, a payment method, and paid amount information. The payment classification distinguishes between payment of the organizer and payment of a participant. The payment method indicates, for example, payment by credit card or payment by cellular phone (the user is billed the amount added to the communication charges of the cellular phone). This bundle of payment information tables 601 is the key of the community database 201.

FIG. 7 is a view showing the detailed contents of the order information table 701. The order information table 701 also has the same order ID as that of the payment information table 601, and further includes a date of order, a total amount, sender information, and a reception confirmation flag. The reception confirmation flag represents whether an approval has been received from the recipient in response to the reception confirmation mail the organizer has sent to the recipient. If this flag is on, the organizer can confirm that the recipient can receive the gift. If the flag is off, no approval has been received from the recipient in response to the reception confirmation mail. If the reception confirmation flag is off on the closing date of participation, the administrator (in this case, the service provider) receives a communication. Upon receiving the communication, the administrator notifies the organizer of it, decides whether to cancel the order by in discussions with the organizer, and performs cancel processing based on the decision. Note that whether to use the reception confirmation is left to the organizer's discretion. If the gift arrives at the recipient certainly, the reception confirmation is unnecessary.

FIG. 8 is a view showing the detailed contents of the delivery information table 801 and the delivery detail information table 802. The delivery information table 801 also has the same order ID as that of the payment information table 601 and the order information table 701, and further includes a delivery ID, a delivery status, a shipping date, an expected date of arrival, an expected time of arrival, and the address of delivery destination (recipient's address). The delivery detail information table 802 includes the same delivery ID as that of the delivery information table 801, and the name of merchandise item to be delivered.

Every time the organizer or a participant inputs the above-described information, the community gift system 200 registers appropriate information in appropriate places of the payment information table 601, the order information table 701, and the delivery information table 801 and updates the information.

[Examples of Display Screens]

Examples of display screens to be displayed on the terminal of the organizer, a participant, or the recipient will be described next with reference to FIGS. 9 to 19.

Figure 9B:

A screen 901 shown in FIGS. 9A and 9B is the screen the community gift system 200 of this embodiment first displays on the organizer terminal. On the screen 901, the organizer selects a gift from a merchandise item list 911. A system that gives flowers as a gift will be described here as an example. However, the present invention is not limited to this and can cope with any other gift.

When the user selects a gift, a screen 902 with the detailed description of the gift is displayed to make him/her confirm. When the user selects "add to cart", a screen 1001 shown in FIG. 10 is displayed to accept input of the name, address, telephone number, and the like of the sender (organizer) as order information. If an already registered user logs in as the organizer, his/her personal information existing in the customer information table is displayed to make the organizer confirm.

On the screen 1001 shown in FIG. 10, the system accepts information about the gift recipient. More specifically, if the recipient has already been registered, the system causes the user to select the recipient from a pull-down menu 1011 and press an OK button 1012. For a new delivery destination, the system accepts selection of an OK button 1013 and causes the user to input detailed information such as the address of delivery destination.

Figure 11A:

Next, on a screen 1101 shown in FIGS. 11A and 11B, the system accepts input of order information. More specifically, the system accepts the gift type, the presence/absence of the use of a message card, the message contents, the desired date of delivery, an explanation message for participants, and the like from the organizer. The organizer can also select whether to send the reception confirmation to the gift recipient. The congratulatory message input here is registered and stored by the congratulatory message registration unit 210.

Figure 12A:

On a screen 1201 shown in FIGS. 12A and 12B, the user decides an amount 1211 of money to be paid for the gift by the user as the organizer and the payment method. In this embodiment, the minimum amount is 2,100 yen. When the payment processing has ended, the community gift system 200 displays a screen 1202 on the organizer terminal to notify him/her of completion of the order. At the same time, the community gift system 200 generates the community database 201 itself, and registers the organizer name, the recipient, the gift type, the delivery date, the amount for participation of the user as the organizer, and the like in each table as needed.

The screen 1202 includes a link 1221 to create a message to send a reception confirmation to the recipient as mail, and a link 1222 to create a message (invitation) to be sent to prospective participants.

Figure 13A:
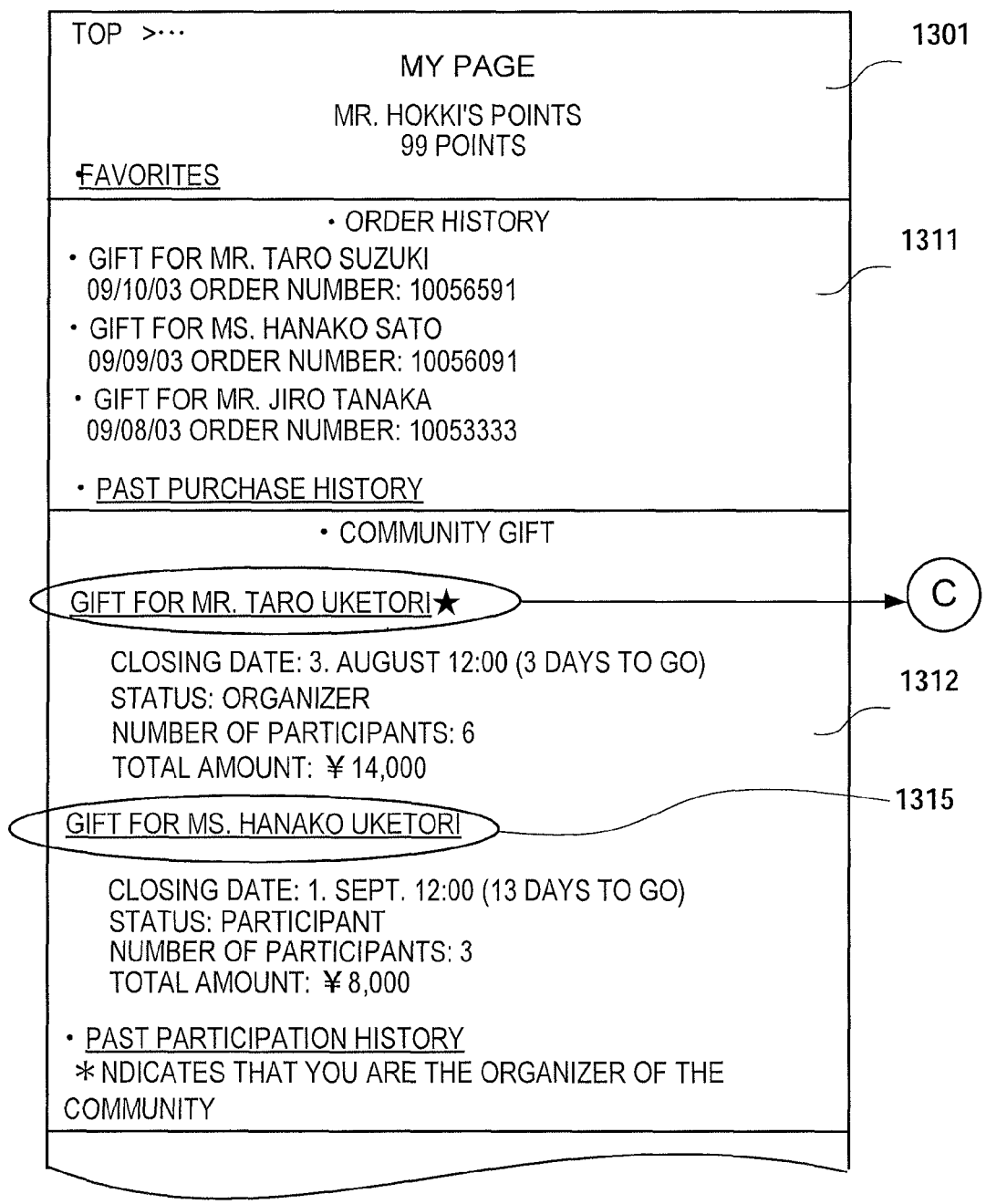

A screen 1301 shown in FIGS. 13A to 13C is the main page of the user registered in the community gift system 200. This page displays an order history 1311 in the past, communities the user formed in the past as the organizer, communities in which the user participated in the past, a remind list to notify the user of anniversaries, gifts the user received in the past, and the like. A screen 1302 is displayed when the community the user is currently managing as the organizer is selected.

That is, the screen 1302 is used to display the information in the community database for the organizer, and shows the recipient, the merchandise item, the total amount for participation, the number of participants, the delivery date, and the like. The screen 1302 also includes a link 1311 to invite participants, and a button 1312 to increase the amount for participation of the user as the organizer.

Figure 14:
FIG. 14 is a view showing an example of a screen displayed by the community gift system according to the second embodiment of the present invention.

A screen 1401 shown in FIG. 14 is used to display information about a community in which the user is involved as a participant. This screen is displayed by selecting a link 1315 on the screen 1301. The screen 1401 displays the recipient, the merchandise item, the total amount for participation, the number of participants, the delivery date, and the like. The screen 1401 also includes a link 1411 to invite other participants, and a button 1412 to increase the amount for participation of the user as a participant.

FIG. 15A is a view showing an example of a message generated by the participation acceptance unit 204 of the community gift system 200 when the link 1411 in FIG. 14 is selected. FIG. 15B is a view showing an example of a message generated by the reception confirmation unit 205 when the link 1221 is selected on the screen 1202 of FIGS. 12A and 12B. As illustrated, since the URL is embedded in the messages in advance, the prospective participant or recipient who has received the message can immediately access the community gift system 200.

Figure 16A:
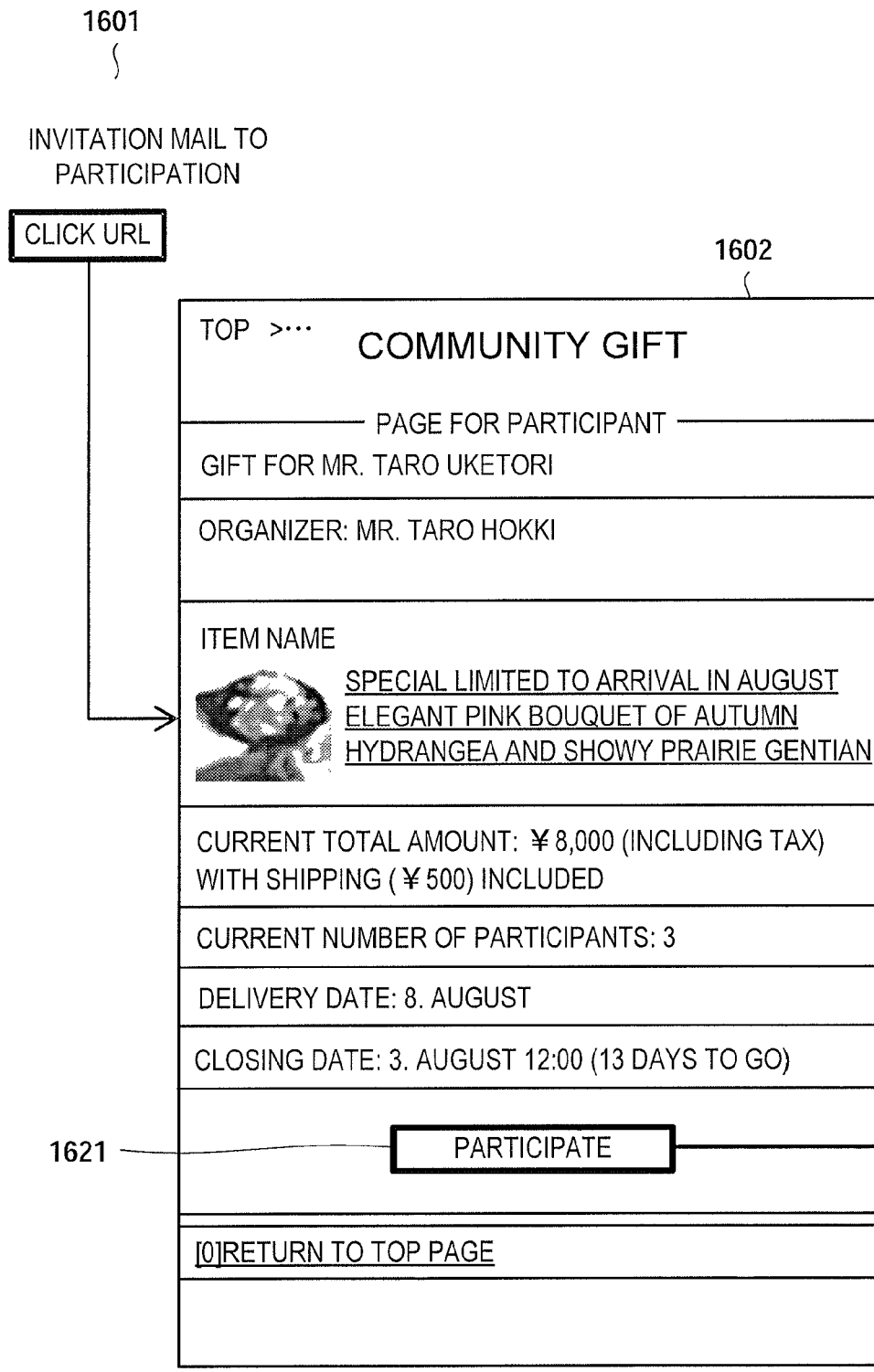
FIGS. 16A and 16B are views showing an example of a screen displayed by the community gift system according to the second embodiment of the present invention.
Figure 16B:
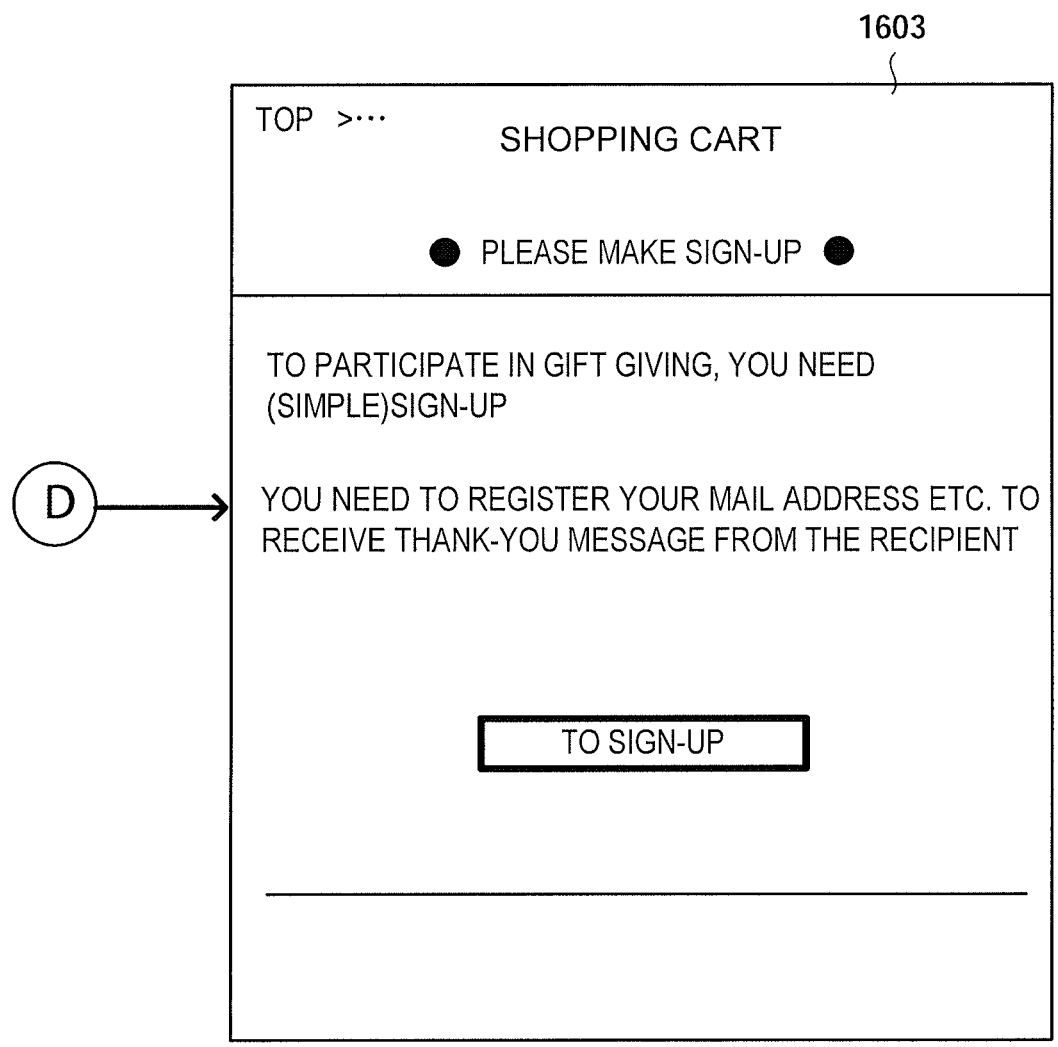

FIGS. 16A and 16B are views showing a screen 1602 displayed by clicking on the URL in the invitation mail shown in FIG. 15A, and a screen 1603 displayed in response to expression of participation there.

As shown on the screen 1602, the gift, the total amount for participation, the number of participants, and the closing date are presented to a prospective participant as well as information about the organizer and information about the recipient. When the user selects a "participate" button 1621, the screen 1603 is displayed. The screen 1603 displays a message to urge the participant to register as a member. Member registration here is simpler than that as an organizer.

Figure 17A:
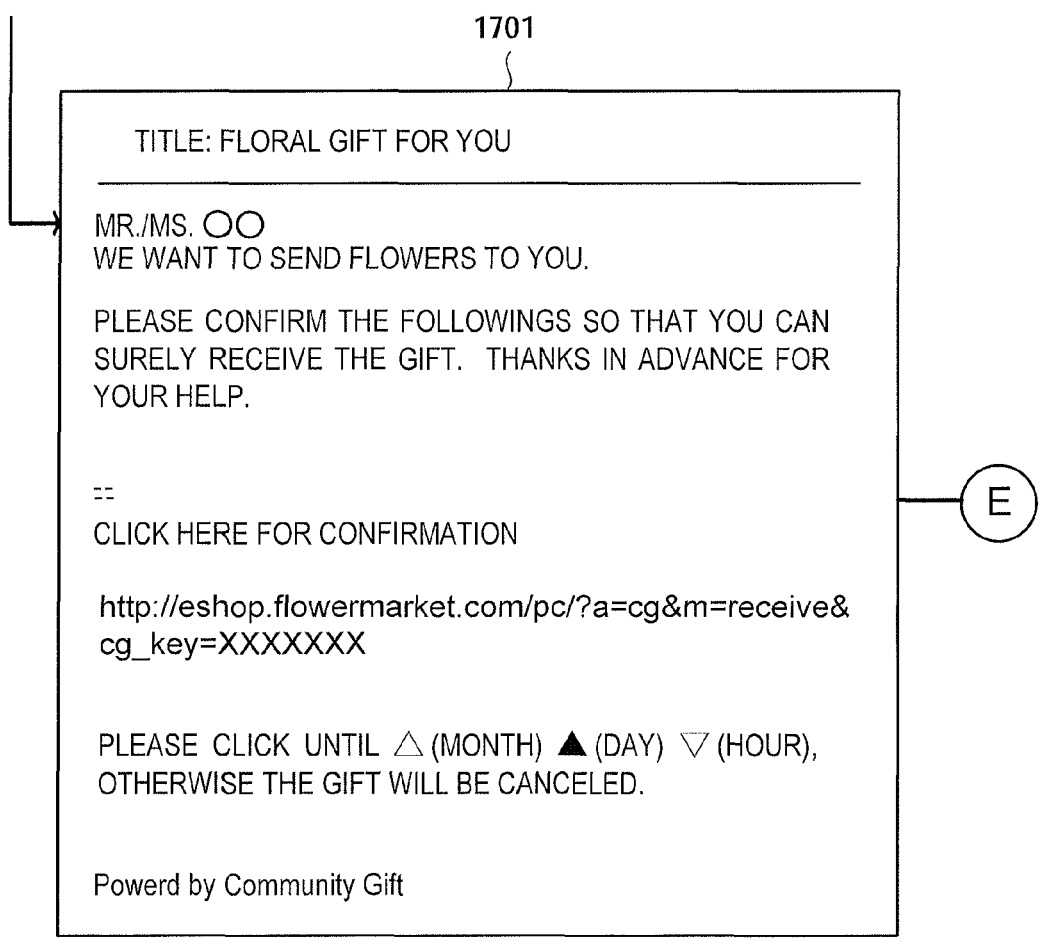
Figure 17C:
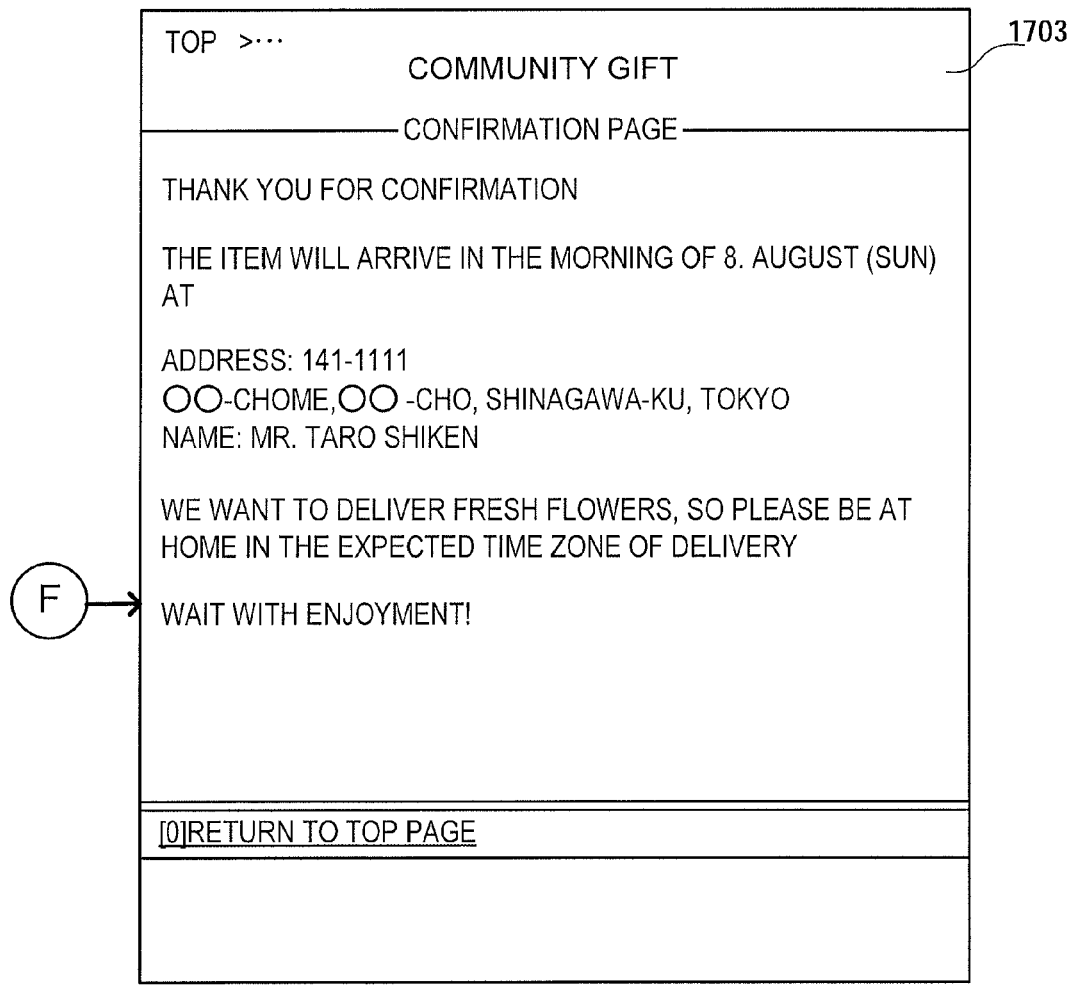

FIGS. 17A to 17C show screens 1702 and 1703 displayed on the recipient terminal in response to access to the URL included in a reception confirmation message 1701. As shown on the screen 1702, the reception confirmation unit 205 sends the screen 1702 including the delivery date and the address of delivery destination to the recipient terminal and causes the recipient to confirm. The recipient can change the delivery date or the address of delivery destination. Upon receiving an approval "no change in address etc." or accepting input of changed information from the recipient, the screen 1703 is displayed. Simultaneously, the reception confirmation flag is set in the order information table 701 shown in FIG. 7.

Figure 18A:
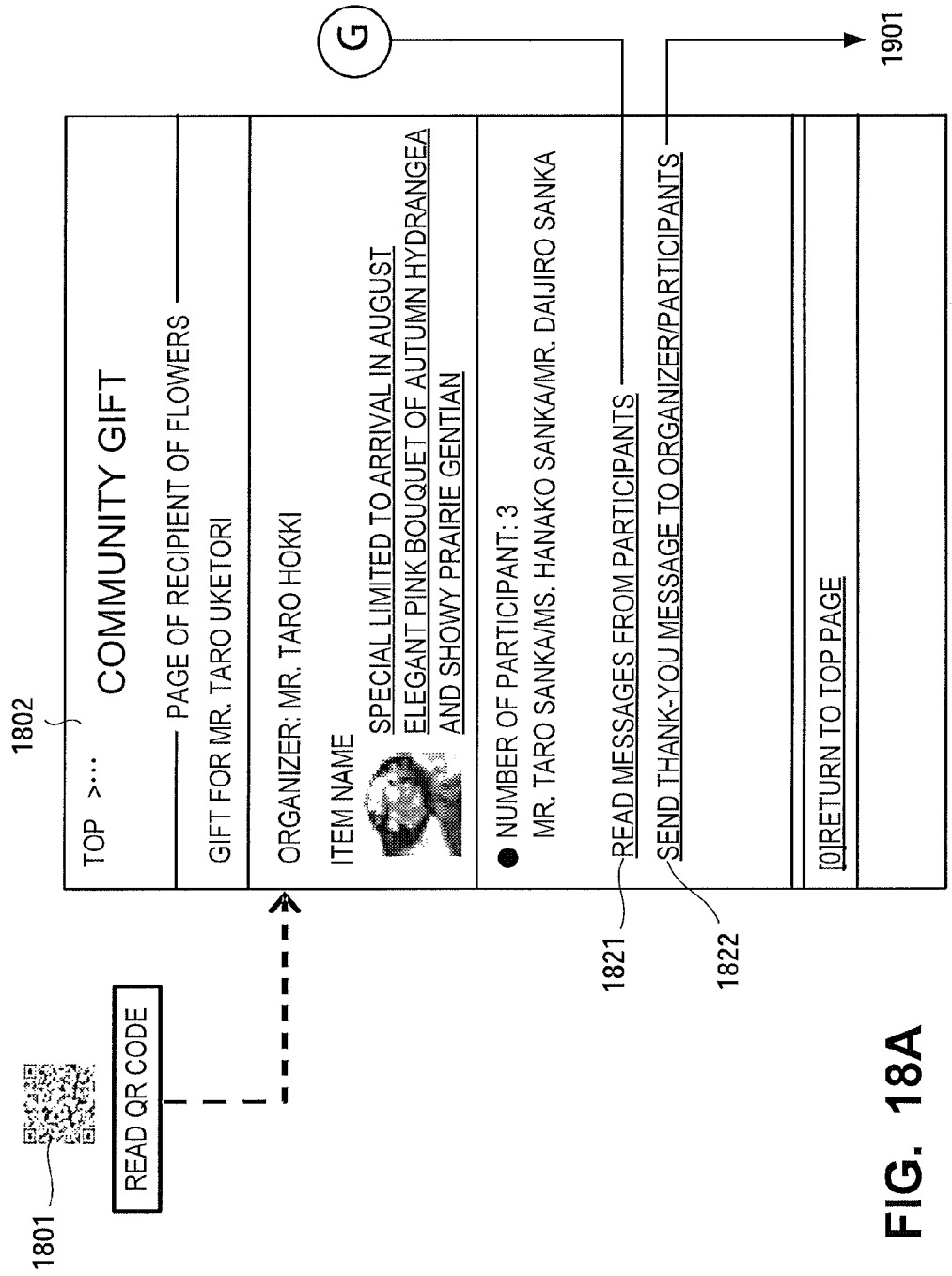
FIGS. 18A and 18B are views showing an example of a screen displayed by the community gift system according to the second embodiment of the present invention.
Figure 18B:
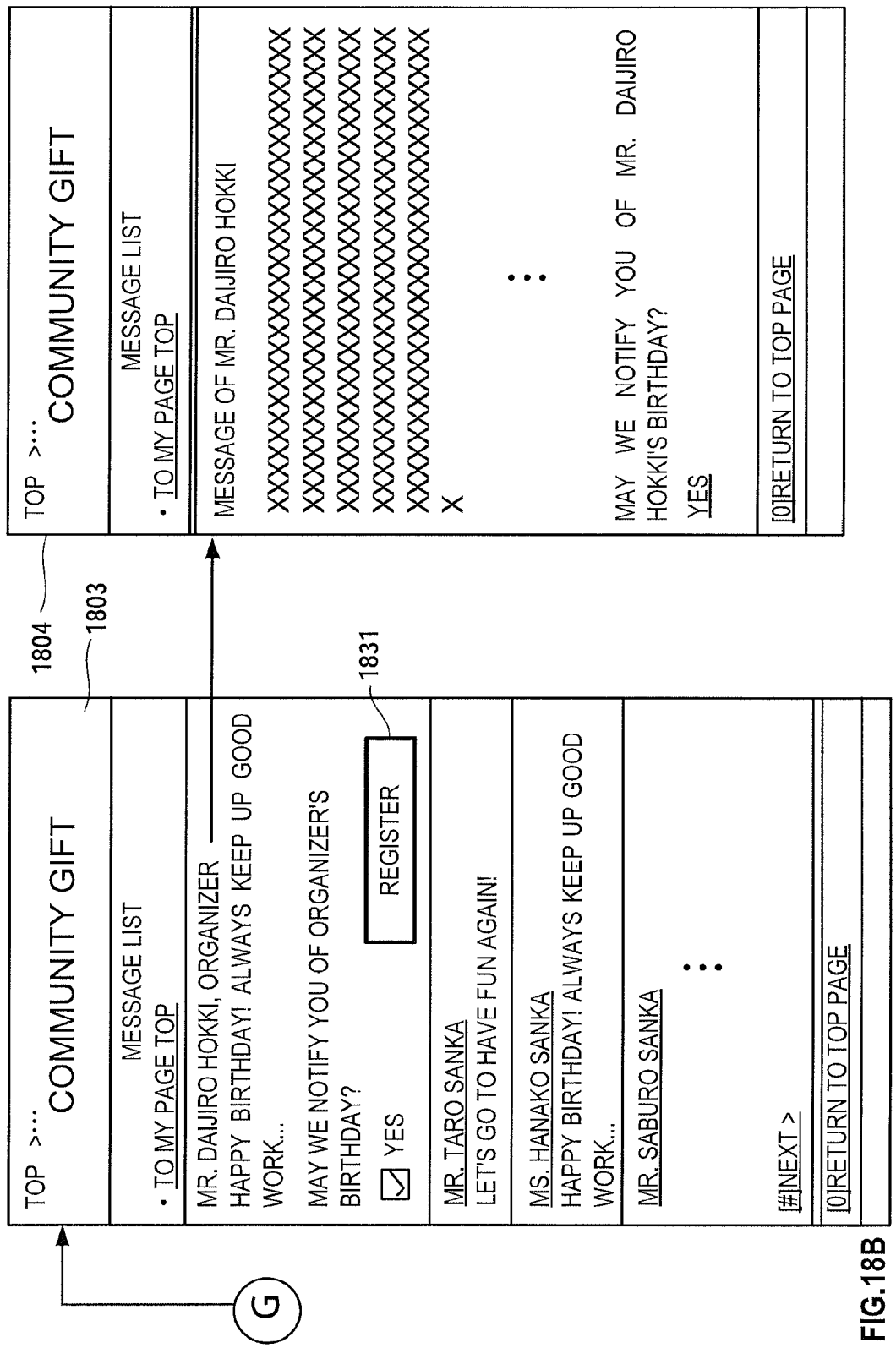

FIGS. 18A and 18B are views showing screens 1802, 1803, and 1804 displayed on the recipient terminal when the recipient has accessed a URL acquired by reading a QR code 1801 printed on the message card attached to the gift.

The screen 1802 presents the organizer name, the contents of the gift, and the participant names on the recipient terminal. The screen 1802 also includes a link 1821 to read messages from the participants, and a link 1822 to send a thank-you message to the organizer and the participants. The thank-you message acceptance unit 207 generates the screen 1803 in response to access to the link 1821 on the recipient terminal and sends it to the recipient terminal. The screen 1803 includes various messages registered by the congratulatory message registration unit 210. The screen 1803 is provided with a button 1831 to register the organizer's birthday. This allows the user to give a gift certainly when the organizer's birthday has approached. Note that it is possible to draw the user's attention to the participants who paid large amounts for participation by, for example, arranging the participant messages in descending order of amount for participation. The screen 1804 displays the message of the organizer or a participant in full text.

Figure 19A:
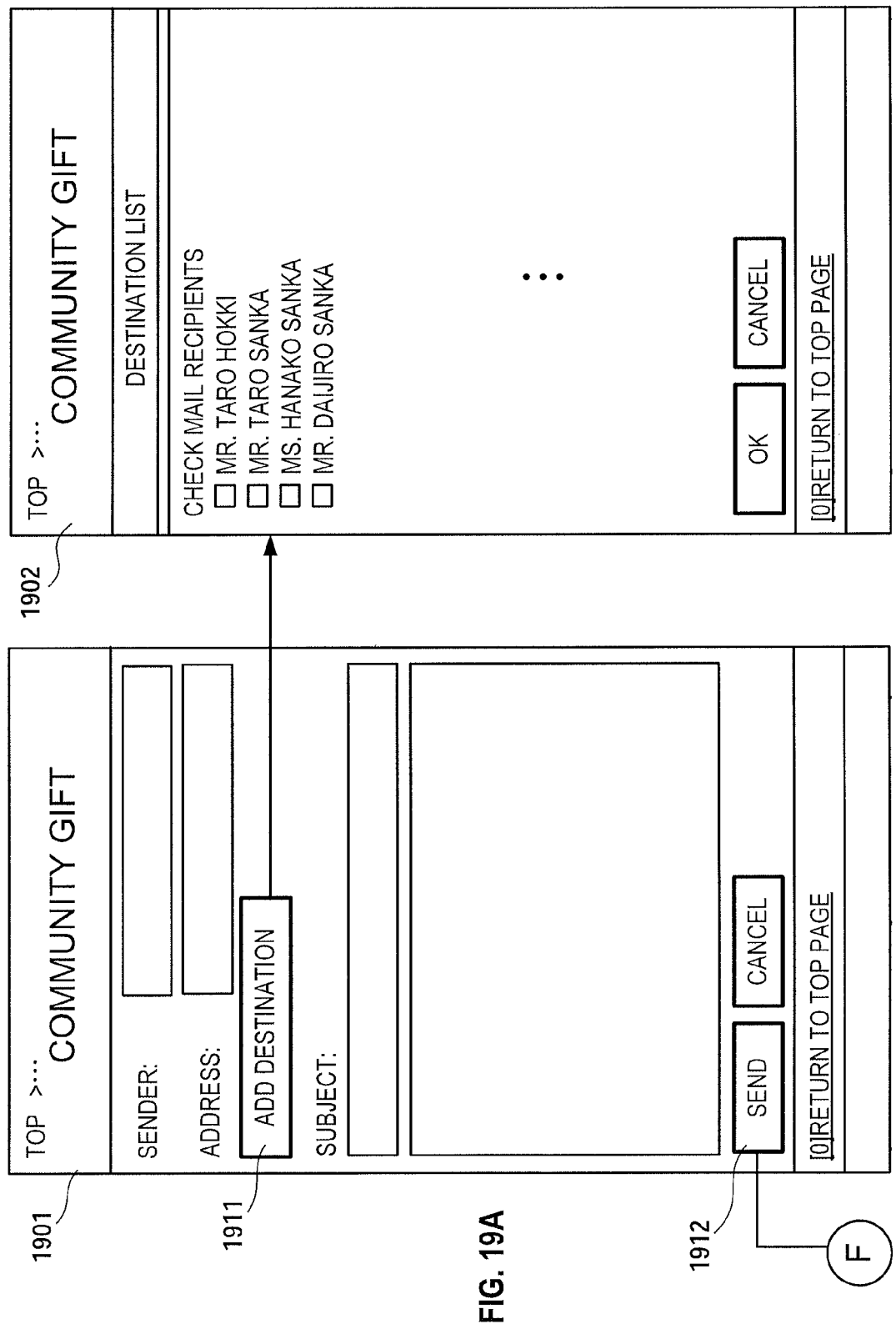
FIGS. 19A and 19B are views showing an example of a screen displayed by the community gift system according to the second embodiment of the present invention.
Figure 19B:
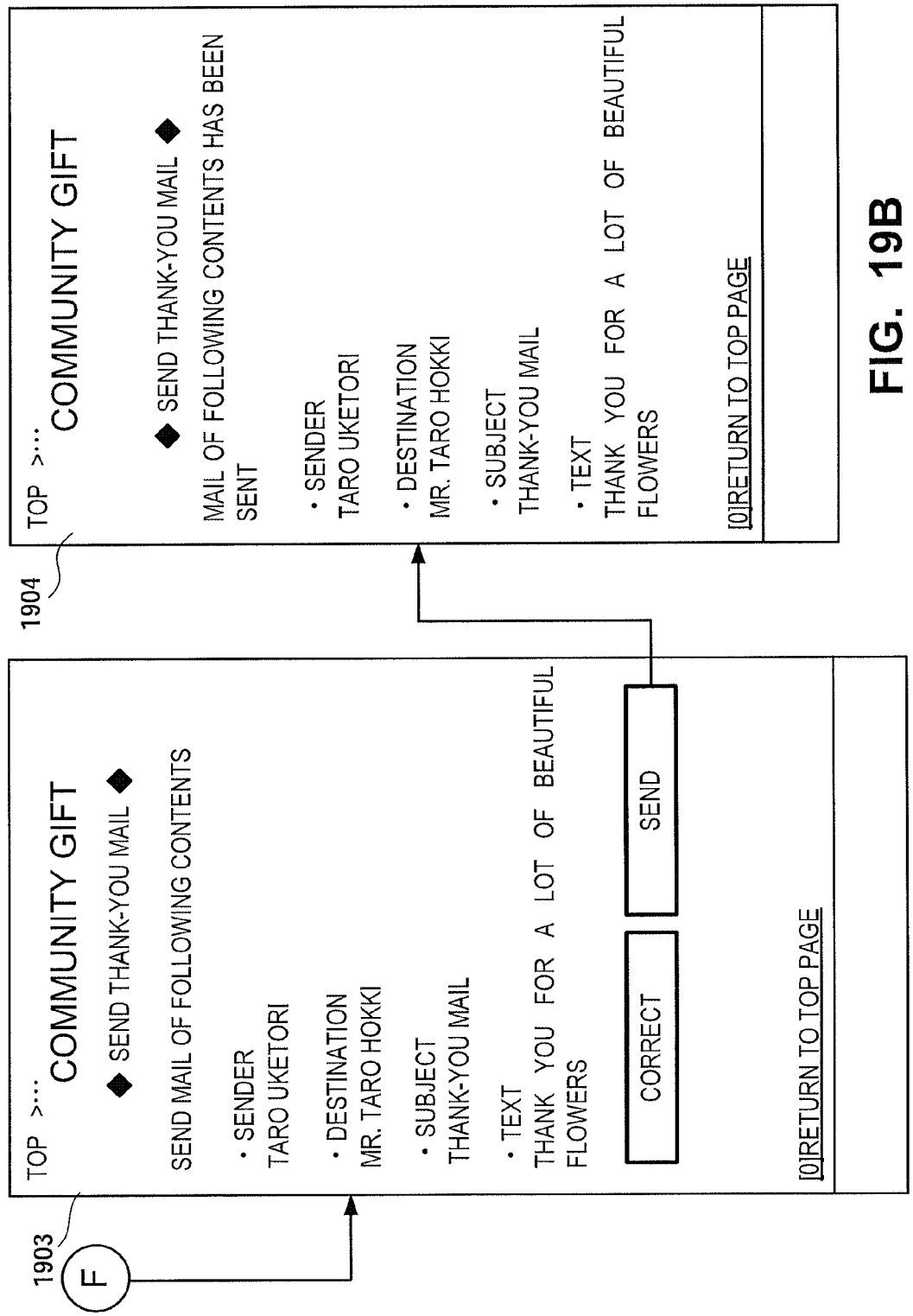

When the user accesses the link 1822 on the screen 1802, a mail creation screen 1901 shown in FIGS. 19A and 19B is displayed. When a button 1911 to add a destination is selected, a screen 1902 is displayed to allow the user to select mail destinations from the organizer and the participants. To send mail, the user selects a send button 1912. In this case, a confirmation screen 1903 is displayed, and the mail is sent. After completion of sending, a screen 1904 is displayed.

[Effects of Embodiment]

As described above, according to the second embodiment, it is possible to provide a community gift system more convenient for a user. More specifically, the organizer can freely designate a gift and a recipient and form a community on the network. In addition, the organizer can easily call on a plurality of friends in remote sites to participate in the community. Each participant can further invite his/her friends to the community. Each participant can decide the amount for participation by himself/herself and pay from the terminal of his/her own. This frees the organizer from burdensomely paying for other participants. Note that the cost of the gift finally equals the total amount for participation of the participants including the organizer.

The person who has received the gift can send a thank-you message even if he/she does not know the addresses or mail addresses of the participants and the like. At this time, the recipient can simultaneously send messages of same contents to the plurality of participants. It is possible to freely select giving a surprise gift without confirming with the recipient or making delivery after confirming with him/her. The organizer can easily confirm the recipient's address, the delivery date, and the like.

(Third Embodiment)

A community gift system according to the third embodiment of the present invention will be explained. The community gift system of this embodiment too is an information processing system that, when giving a gift to a specified recipient, allows an organizer and participants to form a community and collect money in the community as the cost of the gift giving.

When giving a merchandise item with a fixed price, the amount of money collected in the community may differ from the price of the merchandise item. That is, since it is possible in the community to call many unspecified persons for participation, the final amount of collected money cannot be predicted in some cases. A gift such as flowers can cope with any amount of money, and no problem arises. However, if a gift has a fixed price, handling money collected more than the merchandise price is troublesome.

This embodiment proposes a system that enables more flexible gift giving using a gift certificate. In this embodiment, the difference between the merchandise price and the total amount of collected money is charged to a gift certificate, and the gift certificate is also given as a gift.

That is, the community gift system according to this embodiment further includes a calculator that calculates the difference by subtracting the gift giving cost from the total amount of money paid by participants, and a generator that generates a negotiable instrument that is charged with the difference and is to be given to a recipient.

On the other hand, if the amount of collected money falls short of the merchandise price, the system may propose a merchandise item buyable for the collected money. In this case, for example, the community gift system creates mail to request reselection of a buyable merchandise item and sends it to an organizer terminal 140. The system may accept cancel of the community gift itself at this point of time, as a matter of course. The organizer can thus cancel the gift itself if there is no merchandise item desirable as a gift in the lower price range. According to this embodiment, it is possible to give a gift certificate to which the difference between the merchandise price and the amount of collected money is charged even when the organizer selects another buyable merchandise item. This community gift system further includes a notification unit that notifies the organizer of a message to urge him/her to reselect the gift if the total amount of money paid by the participants is less than the gift giving cost.

Note that although a gift certificate has been exemplified above, the present invention is not limited to this, and any negotiable instrument (tradable coupon) chargeable in advance can be used. Not only a card but also points usable for, for example, Internet shopping may be given. The negotiable instrument (tradable coupon) may be usable only in a specific store or commonly in many stores.

As described above, the mechanism that allows to charge the difference between the merchandise price and the amount of collected money to a negotiable instrument (tradable coupon) such as a gift certificate enables to implement a more flexible community gift.

(Other Embodiments)

The embodiments of the present invention have been described above in detail. The present invention also incorporates a system or apparatus that combines the individual features included in the embodiments.

The present invention is also applicable to a system including a plurality of devices or a single apparatus. The present invention is also applicable to a case in which an information processing program for implementing the functions of the embodiments is supplied to the system or apparatus directly or from a remote site. Hence, the present invention also incorporates a program installed in a computer to cause the computer to implement the functions of the present invention, a medium storing the program, and a WWW server that causes a user to download the program.

What is claimed is:

1. A community gift system that, when giving a gift to a specified recipient, allows an organizer who plans gift giving and participants who do not include the organizer to form a community and collect money in the community as a cost of the gift giving, comprising:

a database generator that receives organizer data including a name and contact address of the organizer, and recipient data including a name and address of the recipient, through a network from a terminal of the organizer, and generates a community database storing the organizer data and the recipient data, the community database being able to store participant data specifying the participants and data of money paid by the participants, in association with the stored organizer data and recipient data;

a participation-acceptance-screen generation unit that generates a participation-acceptance-screen and holds the participation-acceptance-screen at a first network address, the participation-acceptance-screen accepting inputs of declaration of participation, participant data specifying the participant who input the declaration of participation, a desired amount of money to be paid by the participant, and a congratulatory message from the participant to the recipient;

a storage unit that, when accepting the declaration of participation on the participation-acceptance-screen, stores the participant data and the desired amount of money in association with the organizer data and the recipient data, in the community database;

a congratulatory message registration unit that registers, in the community database, the congratulatory message in association with the participation data specifying a participant who input the congratulatory message and the recipient data;

an invitation generation order accepting unit that provides, through the network, participant terminals with an invitation generation order accepting screen which accepts a generation order of an invitation for inviting a prospective participant to the gift giving, when the declaration of participation is accepted on the participation acceptance screen and the participation data is stored in the community database;

an invitation generator that, when receiving an invitation generation order from the invitation generation accepting screen, generates the invitation message including the first network address to be sent to the prospective participant terminal and provides the invitation message so that the participants directly send prospective participants the invitation through an email;

a congratulatory message display screen transmitter that generates a congratulatory message display screen including a list of congratulatory messages registered in the community database, and that transmits the congratulatory message display screen to the recipient terminal when receiving an access to a second network address from the recipient terminal;

a thank-you message acceptance screen transmitter that generates a thank-you message acceptance screen on which the recipient inputs a thank-you message and selects a participant to receive the thank-you message from a list of the participants, and that transmits the thank-you message acceptance screen to the recipient terminal when receiving an access to a third network address from the recipient terminal; and a thank-you message transmitter that transmits the thank-you message which is input on the thank-you message acceptance screen by the recipient, to the participant terminal selected on the thank-you message acceptance screen, by using the recipient data stored in the community database.

2. An information processing method that, when giving a gift to a specified recipient, allows an organizer who plans gift giving and participants who do not include the organizer to form a community and collect money in the community as a cost of the gift giving, comprising:

receiving organizer data including a name and contact address of the organizer, and recipient data including a name and address of the recipient, through a network from a terminal of the organizer, generating a community database storing the organizer data and the recipient data, the community database being able to store participant data specifying the participants and data of money paid by the participants in association with the organizer data and the recipient data;

generating a participation acceptance screen for accepting inputs of declaration of participation, participant data specifying the participant who input the declaration of participation, a desired amount of money to be paid by the participant, and a congratulatory message from the participant to the recipient;

holding the participation acceptance screen at a first network address, and storing the participant data and the desired amount of money in association with the organizer data and the recipient data in the community database when accepting the declaration of participation on the participation acceptance screen;

registering, in the community database, the congratulatory message input on the participation acceptance screen in association with the participation data specifying a participant who input the congratulatory message and the recipient data;

providing, through the network, participant terminals with an invitation generation order accepting screen which accepts a generation order of an invitation for inviting a prospective participant to the gift giving, when the declaration of participation is accepted on the participation acceptance screen and the participation data is stored in the community database;

generating the invitation message including the first network address to be sent to the prospective participant terminal when receiving an invitation generation order from the invitation generation accepting screen;

providing the invitation message so that the participants directly send prospective participants the invitation through an email;

generating a congratulatory message display screen including a list of congratulatory messages registered in the community database;

transmitting the congratulatory message display screen to the recipient terminal when receiving an access to a second network address from the recipient terminal;

generating a thank-you message acceptance screen on which the recipient inputs a thank-you message and selects a participant to receive the thank-you message from a list of the participants;

transmitting the thank-you message acceptance screen to the recipient terminal when receiving an access to a third network address from the recipient terminal; and transmitting the thank-you message inputted on the thank-you message acceptance screen by the recipient, to the participant terminal selected on the thank-you message acceptance screen, by using the recipient data stored in the community database.

3. A computer-readable storage medium storing a program causing a computer to execute an information processing method that, when giving a gift to a specified recipient, allows an organizer who plans gift giving and participants who do not include the organizer to form a community and collect money in the community as a cost of the gift giving, the method comprising:

receiving organizer data including a name and contact address of the organizer, and recipient data including a name and address of the recipient, through a network from a terminal of the organizer, generating a community database storing the organizer data and the recipient data, the community database being able to store participant data specifying the participants and data of money paid by the participants in association with the organizer data and the recipient data;

generating a participation acceptance screen for accepting inputs of declaration of participation, participant data specifying the participant who input the declaration of participation, a desired amount of money to be paid by the participant and a congratulatory message from the participant to the recipient;

holding the participation acceptance screen at a first network address, and storing the participant data and the desired amount of money in association with the organizer data and the recipient data, in the community database when accepting the declaration of participation on the participation acceptance screen;

registering, in the community database, the congratulatory message input on the participation acceptance screen in association with the participation data specifying a participant who input the congratulatory message and the recipient data;

providing, through the network, participant terminals with an invitation generation order accepting screen which accepts a generation order of an invitation for inviting a prospective participant to the gift giving, when the declaration of participation is accepted on the participation acceptance screen and the participation data is stored in the community database;

generating the invitation message including the first network address to be sent to the prospective participant terminal when receiving an invitation generation order from the invitation generation accepting screen;

providing the invitation message so that the participants directly send prospective participants the invitation through an email;

generating a congratulatory message display screen including a list of congratulatory messages registered in the community database;

transmitting the congratulatory message display screen to the recipient terminal when receiving an access to a second network address from the recipient terminal;

generating a thank-you message acceptance screen on which the recipient inputs a thank-you message and selects a participant to receive the thank-you message from a list of the participants;

transmitting the thank-you message acceptance screen to the recipient terminal when receiving an access to a third network address from the recipient terminal; and transmitting the thank-you message inputted on the thank-you message acceptance screen by the recipient, to the participant terminal selected on the thank-you message acceptance screen, by using the recipient data stored in the community database.

\* \* \* \* \*